US012452040B2

(12) United States Patent
Gargett et al.

(10) Patent No.: US 12,452,040 B2
(45) Date of Patent: Oct. 21, 2025

(54) CONTEXTUAL KEY MANAGEMENT FOR DATA ENCRYPTION

(71) Applicant: McAfee, LLC, San Jose, CA (US)

(72) Inventors: Mark Ian Gargett, Brighton (GB);
Shashank Visweswara, Crawley (GB);
Wayne Helm Gibson, Crawley (GB);
David Paul Webb, Seaford (GB)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 18/587,518

(22) Filed: Feb. 26, 2024

(65) Prior Publication Data

US 2024/0195609 A1    Jun. 13, 2024

Related U.S. Application Data

(63) Continuation of application No. 17/222,720, filed on Apr. 5, 2021, now Pat. No. 11,943,341, which is a continuation of application No. 16/050,972, filed on Jul. 31, 2018, now Pat. No. 10,972,258.

(51) Int. Cl.
*H04L 9/08* (2006.01)
*G06F 21/62* (2013.01)

(52) U.S. Cl.
CPC .............. *H04L 9/083* (2013.01); *G06F 21/62* (2013.01)

(58) Field of Classification Search
CPC ................................. H04L 9/083; G06F 21/62
See application file for complete search history.

(56) References Cited

U.S. PATENT DOCUMENTS

| | | | |
|---|---|---|---|
| 9,224,000 B1 | 12/2015 | Ghetti |
| 10,482,231 B1 | 11/2019 | Harding |
| 10,972,258 B2 | 4/2021 | Gargett |
| 2004/0022390 A1 | 2/2004 | McDonald |
| 2006/0036605 A1 | 2/2006 | Powell et al. |
| 2006/0190986 A1 | 8/2006 | Mont et al. |
| 2008/0021834 A1 | 1/2008 | Holla |
| 2008/0065882 A1 | 3/2008 | Goodman |

(Continued)

OTHER PUBLICATIONS

United States Patent and Trademark Office, "Non-Final Office Action," mailed in connection with U.S. Appl. No. 16/050,972, on Aug. 4, 2020, 13 pages.

(Continued)

*Primary Examiner* — Vance M Little
(74) *Attorney, Agent, or Firm* — Hanley, Flight & Zimmerman, LLC

(57) ABSTRACT

Example methods, apparatus, systems and articles of manufacture (e.g., physical storage media) to implement contextual key management for data encryption are disclosed. Example apparatus disclosed herein are to identify a combination of context rules mapped to a key associated with encrypted data, the combination of context rules including at least two context rules. Disclosed example apparatus are also to discover first context information and second context information associated with the combination of context rules, the first context information obtained from a request to access the encrypted data, the second context information separate from the request. Disclosed example apparatus are further to evaluate the combination of context rules based on the first context information and the second context information to validate the request.

18 Claims, 9 Drawing Sheets

(56) References Cited

U.S. PATENT DOCUMENTS

| | | | |
|---|---|---|---|
| 2008/0298596 A1 | 12/2008 | Kuraki et al. | |
| 2009/0100268 A1* | 4/2009 | Garcia | G06F 21/6218 |
| | | | 713/184 |
| 2009/0300356 A1* | 12/2009 | Crandell | H04L 9/3231 |
| | | | 380/279 |
| 2010/0199098 A1 | 8/2010 | King | |
| 2014/0096215 A1 | 4/2014 | Hessler | |
| 2015/0347770 A1 | 12/2015 | Whalley et al. | |
| 2016/0065543 A1 | 3/2016 | Muranaka | |
| 2017/0230369 A1* | 8/2017 | Chanda | G06F 21/6218 |
| 2018/0196947 A1 | 7/2018 | Davis | |
| 2020/0044830 A1 | 2/2020 | Gargett et al. | |

OTHER PUBLICATIONS

United States Patent and Trademark Office, "Notice of Allowance," mailed in connection with U.S. Appl. No. 16/050,972, on Dec. 8, 2020, 10 pages.

United States Patent and Trademark Office, "Non-Final Office Action," issued in connection with U.S. Appl. No. 17/222,720, dated Feb. 15, 2023, 12 pages.

United States Patent and Trademark Office, "Final Office Action," issued in connection with U.S. Appl. No. 17/222,720, mailed on Aug. 8, 2023, 11 pages.

United States Patent and Trademark Office, "Advisory Action," issued in connection with U.S. Appl. No. 17/222,720, dated Oct. 18, 2023, 3 pages.

United States Patent and Trademark Office, "Notice of Allowance," issued in connection with U.S. Appl. No. 17/222,720, dated Nov. 17, 2023, 9 pages.

\* cited by examiner

CONTEXTUAL KEY MANAGEMENT FOR DATA ENCRYPTION

RELATED APPLICATION(S)

This patent arises from a continuation of U.S. patent application Ser. No. 17/222,720 (now U.S. Patent No. 11,943,341), which is titled "CONTEXTUAL KEY MANAGEMENT FOR DATA ENCRYPTION," and which was filed on Apr. 5, 2021, which is a continuation of U.S. patent application Ser. No. 16/050,972 (now U.S. Pat. No. 10,972,258), which is titled "CONTEXTUAL KEY MANAGEMENT FOR DATA ENCRYPTION," and which was filed on Jul. 31, 2018. Priority to U.S. patent application Ser. No. 17/222,720 and U.S. patent application Ser. No. 16/050,972 is claimed. U.S. patent application Ser. No. 17/222,720 and U.S. patent application Ser. No. 16/050,972 are hereby incorporated herein by reference in their respective entireties.

FIELD OF THE DISCLOSURE

This disclosure relates generally to data encryption and, more particularly, to contextual key management for data encryption.

BACKGROUND

Data encryption is commonly used to protect data in modern computing environments. Data encryption techniques typically employ one or more keys to encrypt unencrypted data and later decrypt the encrypted data. Modern computing environments routinely implement or access key management services that create, store and serve the keys employed for data encryption and decryption.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
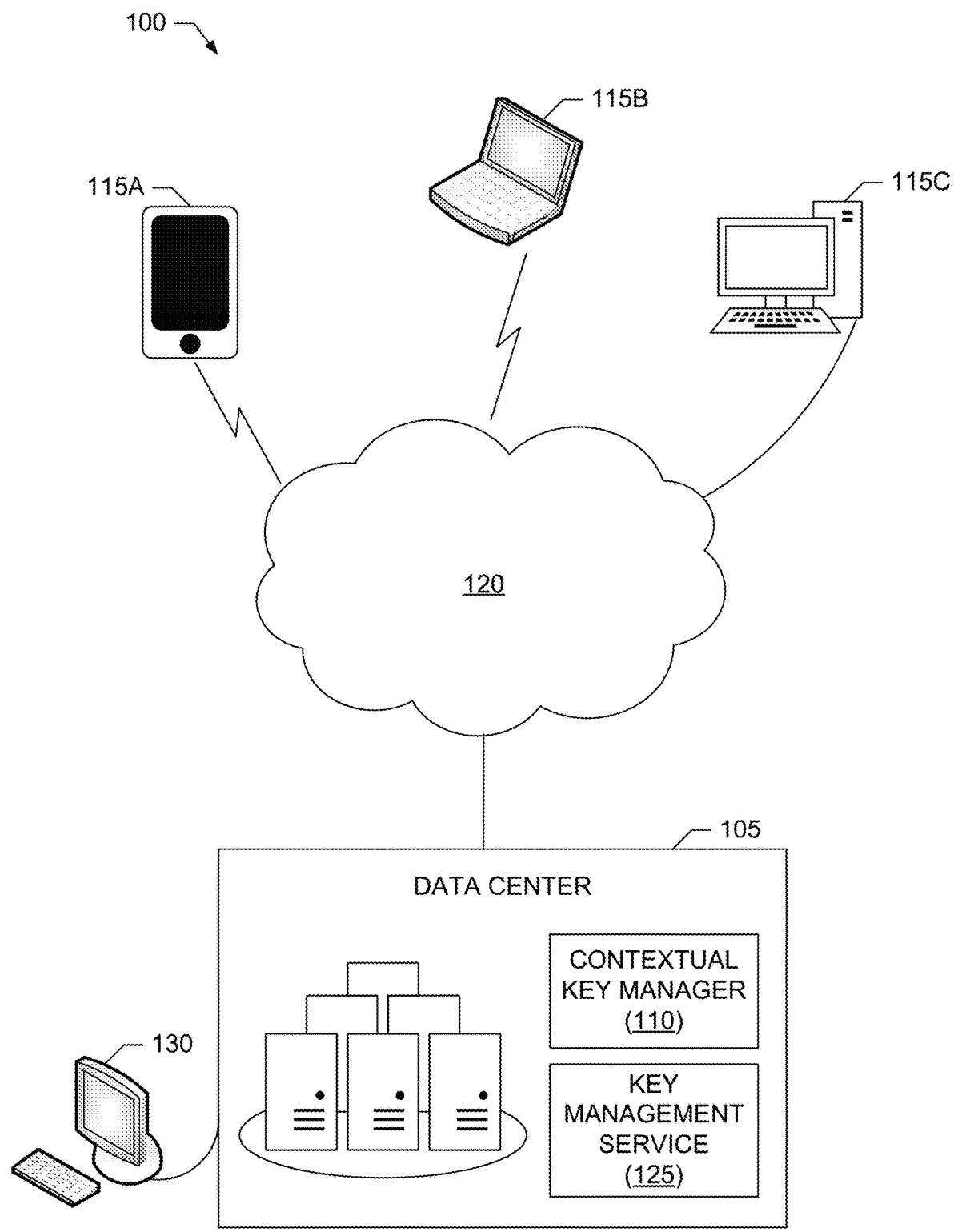
FIG. 1 is a block diagram of an example computing environment including an example data center with an example contextual key manager implemented in accordance with teachings of this disclosure to perform contextual key management for data encryption.

Example methods, apparatus, systems and articles of manufacture (e.g., physical storage media) to implement contextual key management for data encryption are disclosed herein. Example apparatus disclosed herein to perform contextual encryption key management, which are also referred to herein as contextual key managers, include an example context discoverer to discover context information associated with a request to access first encrypted data. Such disclosed example apparatus also include an example contextual key mapper to identify a combination of context rules associated with a key that is to provide access to the first encrypted data, validate the context information associated with the request based on the combination of context rules associated with the key to determine whether the request to access the first encrypted data is valid, and obtain the key from a key management service when the request to access the first encrypted data is valid.

In some disclosed examples, the contextual key mapper is further to provide the key to an encryption engine that is to decrypt the first encrypted data in response to the request to access the first encrypted data.

Additionally or alternatively, at least some disclosed example apparatus further include a context rule engine to define a plurality of possible contexts and associated context rules to be evaluated by the context discoverer and the contextual key mapper. For example, the plurality of possible contexts can be a plurality of heterogeneous contexts including at least two of a data classification context, an access classification context, a geographic location context, a time context, a business organization context, a user context, a data destination context and/or other context(s). In such examples, the combination of context rules can include at least two of a data classification context rule associated with the key, an access classification context rule associated with the key, a geographic location context rule associated with the key, a time context rule associated with the key, a business organization context rule associated with the key, a user context rule associated with the key, a data destination context rule associated with the key and/or other context rule(s) associated with the key. Furthermore, in at least some such disclosed examples, the context discoverer is to determine at least two of a data classification context value associated with the request to access the first encrypted data, an access classification context value associated with the request to access the first encrypted data, a geographic location context value associated with the request to access the first encrypted data, a time context value associated with the request to access the first encrypted data, a business organization context value associated with the request to access the first encrypted data, a user context value associated with the request to access the first encrypted data, a data destination context value associated with the request to access the first encrypted data, and/or other context values(s) associated with the request to access the first encrypted data.

Additionally or alternatively, in at least some disclosed examples in which the context information is first context information, the context discoverer is further to evaluate, based on the plurality of possible contexts, second context information associated with first unencrypted data to determine the combination of context rules associated with the key. In at least some such disclosed examples, the context discoverer evaluates the second context information associated with the first unencrypted data in response to a request to encrypt the first unencrypted data to form the first encrypted data. Furthermore, in at least some such disclosed examples, the contextual key mapper is to determine whether the combination of context rules has been determined previously for other unencrypted data that has undergone encryption, send a request to the key management service to retrieve the key when the combination of context rules has been determined previously for other unencrypted data that has undergone encryption, or send a request to the key management service to generate the key when the combination of context rules has not been determined previously for other unencrypted data that has undergone encryption.

In at least some such disclosed examples, the contextual key mapper may further provide the key to the encryption engine to encrypt the first unencrypted data to form the first encrypted data. Also, in at least some such disclosed examples, the contextual key mapper is further to map the combination of context rules associated with the key to a key identifier identifying the key, provide the key identifier to the encryption engine, which is to include the key identifier with the first encrypted data, and in response to the request to access the first encrypted data, map the key identifier included with the first encrypted data to the combination of context rules associated with the key to identify the combination of context rules associated with the key.

These and other example methods, apparatus, systems and articles of manufacture (e.g., physical storage media) to implement contextual key management for data encryption are disclosed in further detail below.

Contextual key management for data encryption as disclosed herein provides technical solutions to the technical problem of managing a complex data protection environment in which data is to be protected and access is to be restricted to varying degrees depending on a range of heterogeneous contextual factors. These heterogeneous contextual factors may be diverse and examples include, but are not limited to, a classification of the data, a storage location of the data, a location from which the data is permitted to be accessed, a time at which the data is permitted to be accessed, identification information for a system and/or user accessing the data, etc. Many existing encryption techniques for data protection utilize a single encryption key for all data, or simplistic rules based on having just a few different keys selected based on homogenous factors, such as different classifications of data content. Having large amounts of data encrypted with just a few keys can make key management simple but increases the risk of theft of large amounts of data because theft of a single key can expose many data files, data elements, etc. Furthermore, from an access control point-of-view, the risk vector is large because the fewer the number of keys, the larger the group of people that has access to each key, which increases the vulnerability of each key. Conversely, data protection solutions in which many keys are used to divide data into smaller groups for protection can reduce risk and improve access control granularity, but may require a more complex management layer for controlling use of and access to these keys. Example contextual key management solution disclosed herein provide highly granular protection, with a potentially unlimited number of keys used to protect different categories of data, while also providing simple and intuitive key management by hiding key management complexity from the administrator.

Turning to the figures, a block diagram of an example computing environment 100 including an example data center 105 with an example contextual key manager 110 implemented in accordance with teachings of this disclosure to perform contextual key management for data encryption is illustrated in FIG. 1. The example data center 105 can be any type of data center, cloud service, server farm, etc., that receives data, stores data, provides access to data, etc. In the illustrated example of FIG. 1, the data center 105 is in communication with one or more computing devices, such as the example computing devices 115A-C, which provide and/or gain access to data maintained by the data center 105. The example computing devices 115A-C include one or more of, but are not limited to, an example mobile phone 115A, an example notebook computer 115B and an example desktop computer 115C. The computing devices 115A-C communicate with the data center 105 via an example network 120, which can be implemented by any type(s) and/or number of networks, such as one or more wireless networks (e.g., mobile cellular networks, wireless local area networks, satellite networks, etc.), one or more wired networks (e.g., cable networks, dedicated transmission lines, etc.), the Internet, etc.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The example data center 105 of FIG. 1 also includes or has access to an example key management service 125. As mentioned above, the encryption keys utilized in a data protection ecosystem, such as the example computing environment 100, are typically stored within a key management service, such as the key management service 125. In the illustrated example, the key management service 125 provides secure key storage backed up with hardware security measures to prevent at-rest key theft. Further, the key management service 125 releases the appropriate encryption keys once a system or user has been authenticated.

In the illustrated example of FIG. 1, the contextual key manager 110 enhances the key management service 125 by implementing a mapping layer between contextual factors and the encryption keys. The mapping layer implemented by the contextual key manager 110 is based on relatively simple rules involving contextual information, which allows for easy management of data access control. For example, the contextual key manager 110 may specify a first context and associated context rule in which a first key, Key1, is to be used to protect data governed under the Health Insurance Portability and Accountability Act (HIPAA data), may specify a second context and associated second context rule in which a second key, Key2, is to be used to protect secret data, etc. When data (e.g., a data file, a data object, etc.) is to be encrypted, the contextual key manager 110 discovers relevant contextual information (e.g., based on a defined set of possible contexts, as disclosed below), and uses the discovered context information to identify the one or more context rules associated with the data and to infer, based on the context rule(s), a particular key (which may require creation of a new key, as disclosed below) to be used to encrypt the data. For example, the contextual key manager 110 may discover that a first document contains HIPAA data and, thus, determines that Key1 corresponding to the first context rule described above is to be used to protect (e.g., encrypt) the document, whereas the contextual key manager 110 may discover that a second document contains HIPAA data and is secret and, thus, determines that a new key, Key3, needs to be created to cover the combination of first and second context rules described above for these context values. The contextual key manager 110 may discover context information for data using any context discovery mechanism or combination of context discovery mechanisms such as, but not limited to, analyzing text stored in a data file, analyzing header data of the data file, analyzing metadata contained in the data file, etc. When access to encrypted data (e.g., an encrypted data file, an encrypted data object, etc.) is requested (such as when key release is requested), the contextual key manager 110 determines whether to grant the requesting user (or system, device, etc.) access to the key dependent on relatively simple rules governing the contextual information to which the particular key for that encrypted data is mapped. Although the individual context rules themselves are relatively simple, the combination of the context values (which may be many) yields an associated combination of context rules that provides highly granular control. For example, the contextual key manager 110 may determine that a requested, protected document contains HIPAA data and is secret, and may discover that the requesting user is permitted access to HIPAA data but is not permitted access secret data. Thus, in such an example, the contextual key manager 110 derives a combined access rule implied by the intersection between the individual access rules for HIPAA data and secret data, which results in a determination that the user cannot access the particular key (e.g., Key3) associated with the combined access rule for that document.

By implementing such a mapping layer, the contextual key manager 110 provides several benefits to the data center 105. For example, the contextual key manager 110 enhances the data protection ecosystem provided by the data center 105 by supporting potentially complex encryption key usage and/or access scenarios, but that are based on a relatively simple and intuitive set of rules to enforce these scenarios. Also, there is no need for manual key management, and therefore no practical limit to the number of keys managed by the contextual key manager 110. Rather, the contextual key manager 110 provides a flexible and automatic key management capability to be harnessed by users of the data center 105 without having to limit the number of keys to an amount capable of being managed by a human. Furthermore, because use of the contextual key manager 110 results in fewer data objects being encrypted with any given key, the impact of any given key being stolen is reduced. As yet another example benefit, the contextual information discovered at the point of data protection by the contextual key manager 110 is recorded in a way that is indelible and remote to the data itself because the encryption key obtained by the contextual key manager 110 for a given data object is specific to the context values determined for that data object at the point of encryption and, thus, forms a contextual fingerprint for the key and the associated data being protected by the key. For example, documents encrypted with Key3 in the example above, by definition, include HIPAA data and are secret. In other words, the combination of context values determined by the contextual key manager 110 for given encrypted data can be inferred from the combination of context rules mapped to the key for that given encrypted data. By comparison, tagging of files with their classification, as is done in existing data loss prevention systems, is open to tampering by bad actors.

The example data center 105 of FIG. 1 also includes an example administrative workstation 130 to allow an operator to administer the data center 105 and control operation of the contextual key manager 110 and the example key management service 125. As disclosed in further detail below, the contextual key manager 110 is able to accept user input (e.g., from the administrative workstation 130) defining set(s) of possible contexts and/or associated context access rules to be used by the contextual key manager 110. The example administrative workstation 130 can be implemented by any type of computing device, and the example data center 105 can include any number of administrative workstation 130.

Figure 2:
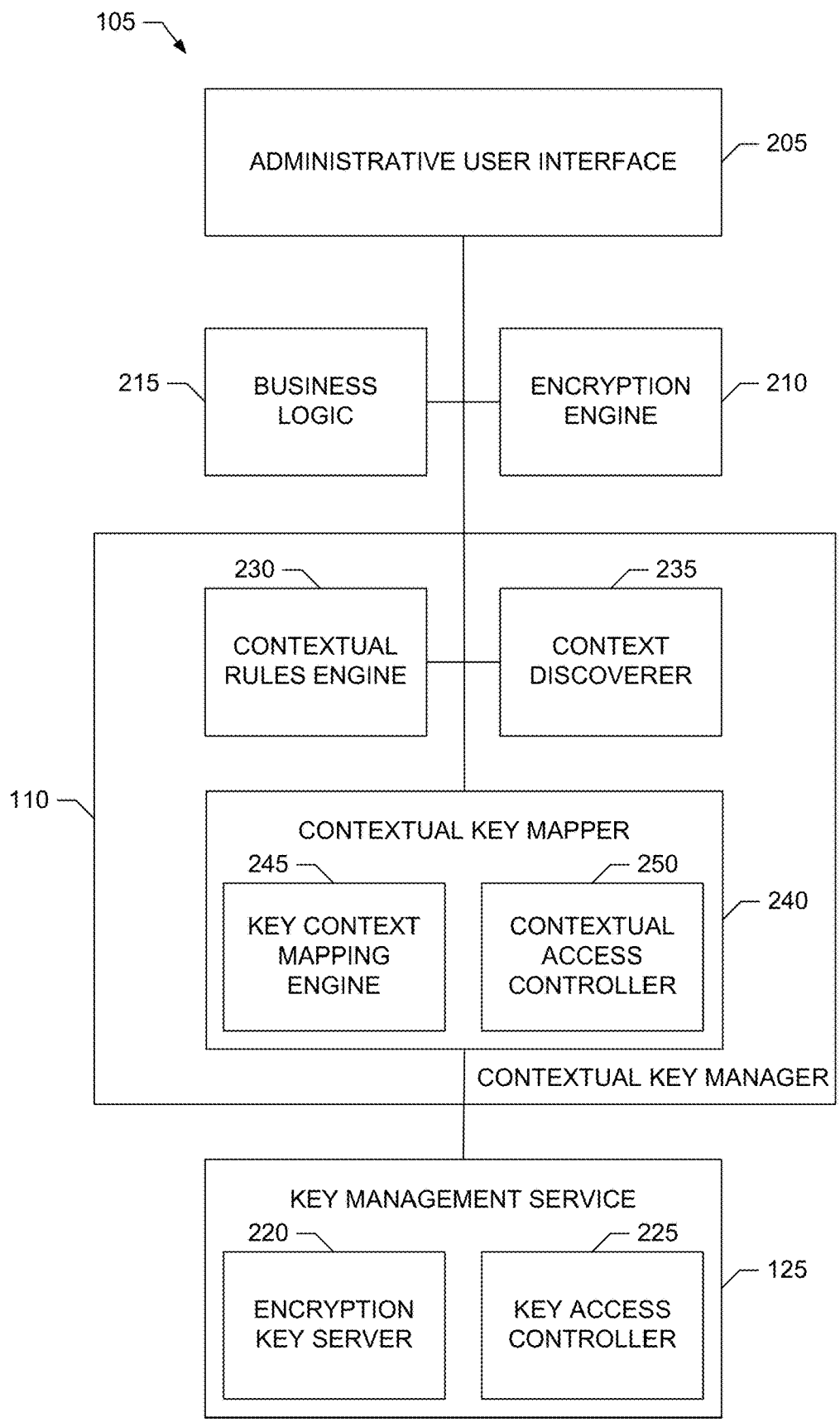
FIG. 2 is a detailed block diagram of the example data center and the example contextual key manager of FIG. 1.

A more detailed block diagram of the example data center 105 of FIG. 1 is illustrated in FIG. 2. In the illustrated example of FIG. 2, aspects of the data center 105 related to contextual key management for data encryption are shown, whereas other aspects are omitted for clarity. The example data center 105 of FIG. 2 includes the example contextual key manager 110 and the example key management service 125 described above in connection with FIG. 1. The example data center 105 of FIG. 2 also includes an example administrative user interface 205, an example encryption engine 210 and example business logic 215.

In the illustrated example of FIG. 2, the administrative user interface 205 interfaces with or is otherwise in communication with the example administrative workstation 130 to obtain context and access control configuration information to be used to configure operation of the contextual key manager 110. Operation of the administrative user interface 205 is described in further detail below.

In the illustrated example of FIG. 2, the encryption engine 210 is provided to encrypt data and decrypt encrypted data. The encryption engine 210 can implement any number and/or type(s) of data encryption techniques, which are configured according to rules specified by the business logic 215. Operation of the encryption engine 210 is described in further detail below.

The example key management service 125 of FIG. 2 includes an example encryption key server 220 and an example key access controller 225. The encryption key server 220 of the illustrated example creates and returns keys to be used to encrypt and decrypt data. The key access controller 225 of the illustrated example controls access to the keys to be served by the encryption key server 220. The key access controller 225 may implement any conventional or unconventional access control technique(s), or combination thereof, to determine whether to provide access to keys requested from the encryption key server 220. Operation of the encryption key server 220 is described in further detail below.

In the illustrated example of FIG. 2, the contextual key manager 110 includes an example contextual rules engine 230, an example context discoverer 235 and an example contextual key mapper 240. The contextual rules engine 230 of the illustrated example is an enhancement over prior classification rule engines used in data loss prevention systems. Unlike prior classification rule engines, the contextual rules engine 230 defines classification rules based on potentially many more heterogenous levels of contextual information. In some examples, each context rule defines enforcement criteria, and may or may not specify an access restriction. For example, the contextual rules engine 230 can, based on user input received from the administrative user interface 205, define a set of possible contexts each having one or more possible context values. Examples of possible contexts and associated context values include, but are not limited to, a data classification context, an access classification context, a geographic location context, a time context, a business organization context, a user context, a data destination context, etc. For example, the contextual rules engine 230 may define a data classification context having possible context values of "HIPAA data," which is a context for data associated with medical content and having an access restriction, "PCI data," which is a context for data associated with payment card information and having an access restriction, etc. As another example, the contextual rules engine 230 may define an access classification context having possible context values of "secret," which is a context for data that is secret and has an access restriction, "confidential," which is a context for data that is confidential and has an access restriction. As a further example, the contextual rules engine 230 may define a business organization context having possible context values of "HR," which is a context for data associated with a human resources organization and having an access restriction, "finance," which is a context for data associated with a financial organization and having an access restriction, etc. As yet another example, the contextual rules engine 230 may define a user context having possible context values associated with user names (e.g., "Jane Doe") and may not have an access restriction. As yet a further example, the contextual rules engine 230 may define a data destination context having possible context values associated with destination of the data, such as, but not limited to, "SharePoint," which a context for data being uploaded to a SharePoint server and that may have no access restriction, etc. Operation of the contextual rules engine 230 is described in further detail below.

In the illustrated example, the contextual rules engine 230 also defines, based on user input received from the administrative user interface 205, a set of individual context rules based on the possible contexts and associated context values. For example, a first context rule may specify that data having a data classification context value of "HIPAA data" is to be protected (e.g., encrypted and subject to access restriction), a second context rule may specify that data having a data classification context value of "PCI data" is to be protected (e.g., encrypted and subject to access restriction), a third context rule may specify that data having an access classification context value of "secret" is to be protected (e.g., encrypted and subject to access restriction), a fourth context rule may specify that data having an access classification context value of "confidential" is to be protected (e.g., encrypted and subject to access restriction), a fifth context rule may specify that data having an business organization context value of "HR" is to be protected (e.g., encrypted and subject to access restriction), a sixth context rule may specify that data having an business organization context value of "finance" is to be protected (e.g., encrypted and subject to access restriction), a seventh context rule may specify that data having a user context value of "Jane Doe" is to be protected (e.g., encrypted and subject to access restriction), etc.

The context discoverer 235 of the illustrated example discovers contextual information relating to the data to be encrypted. The context discoverer 235 performs such discovery at the point a data protection policy is enforced (e.g., such as when the data is moved to backup storage, etc.). The context discoverer 235 discovers the context information for the data to be encrypted based on the group of possible contexts and associated possible context values and context rules defined by the contextual rules engine 230. By parsing text and/or other information included in data (e.g., a data file, a data object, etc.) to be encrypted, evaluating header information, metadata, etc., associated with the given data to be encrypted, evaluating other contextual values such as system clock and/or network settings, etc., and/or implementing any other context discovery technique(s), the context discoverer 235 determines context values (e.g., user, destination, file type, time of day, geolocation, etc.) for the given data that correspond to the group of possible contexts defined by the contextual rules engine 230. In some examples, the context discoverer 235 limits discovery of contextual information to the possible contexts for which rules have been defined by the contextual rules engine 230. Operation of the context discoverer 235 is described in further detail below.

The contextual key mapper 240 of the illustrated example is responsible for ensuring keys exist for the possible contexts and associated context values and context rules that have been defined by the contextual rules engine 230. The contextual key mapper 240 also ensures contextual access restrictions are met before requesting keys from the key management service 125. While the total number of individual possible context values and associated context rules (and keys associated with them) may be relatively small, the number of combinations of these context values and associated context rules can become large. Specifically, when combined, N possible individual context values can yield $2^{N-1}$ different keys, with each key corresponding to a respective different combination of context rules corresponding to the possible individual context values. A feature of the contextual key mapper 240 is to request key creation on-demand, which helps prevent a performance and storage bottleneck within the key management service 125. In this way, the contextual key mapper 240 forms a sparse matrix that maps combinations of individual context rules to corresponding keys only as the specific combinations of context values associated with the individual context rules are encountered, and after some time the sparse matrix is likely to tend to a stable state. In some examples, the contextual key mapper 240 is implemented as a separate component that interfaces with the key management service 125, (e.g., such as an existing key management service). In other examples, the contextual key mapper 240 is implemented as part of the key management service 125. To implement such functionality, the example contextual key mapper 240 of FIG. 2 includes an example key context mapping engine 245 and an example contextual access controller 250. Operation of contextual key mapper 240, including the key context mapping engine 245 and the contextual access controller 250, is described in further detail below.

Figure 3:
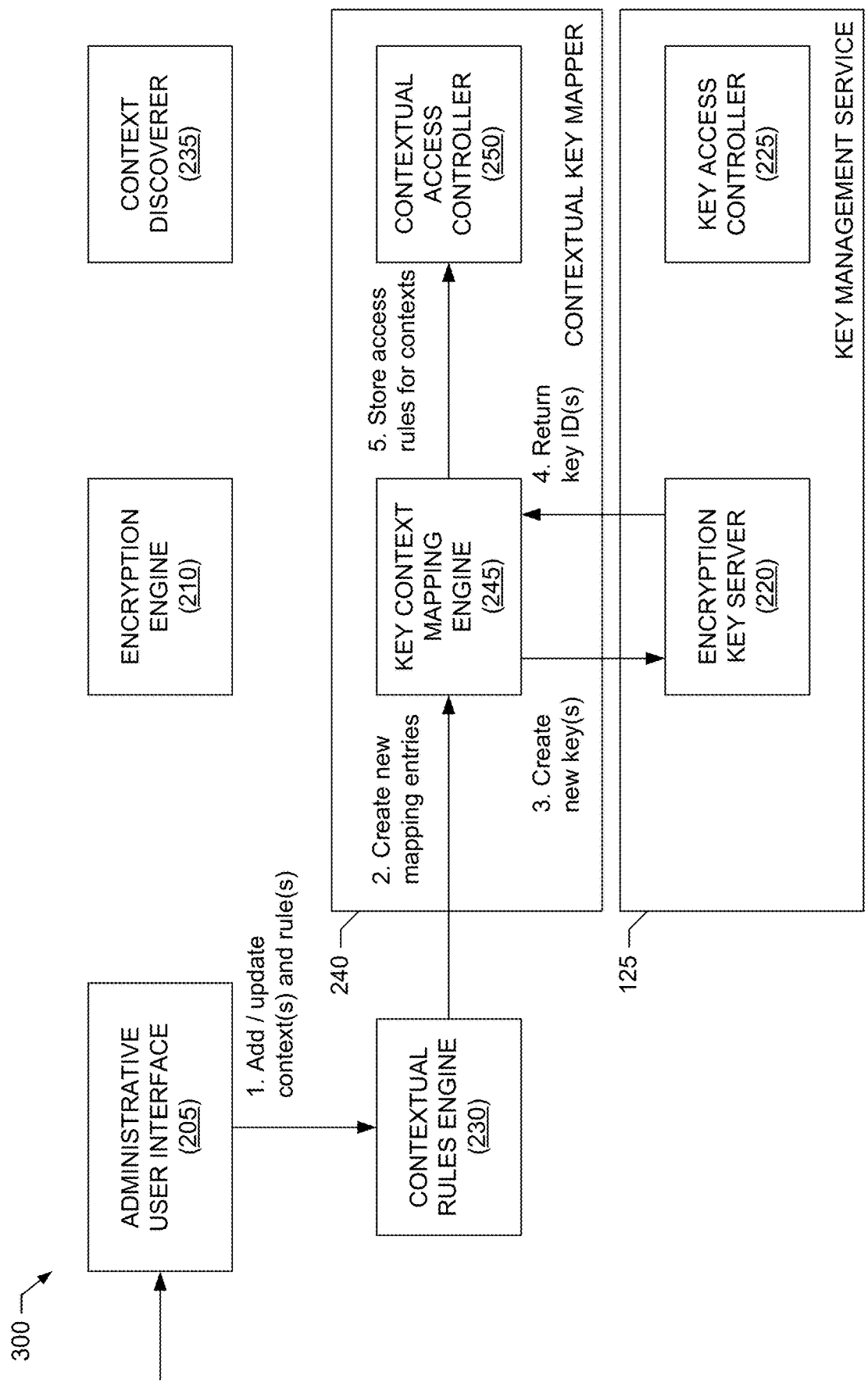
FIG. 3 illustrates an example operation of the contextual key manager of FIGS. 1 and/or 2 to manage contexts and access rules in accordance with teachings of this disclosure.
Figure 4:
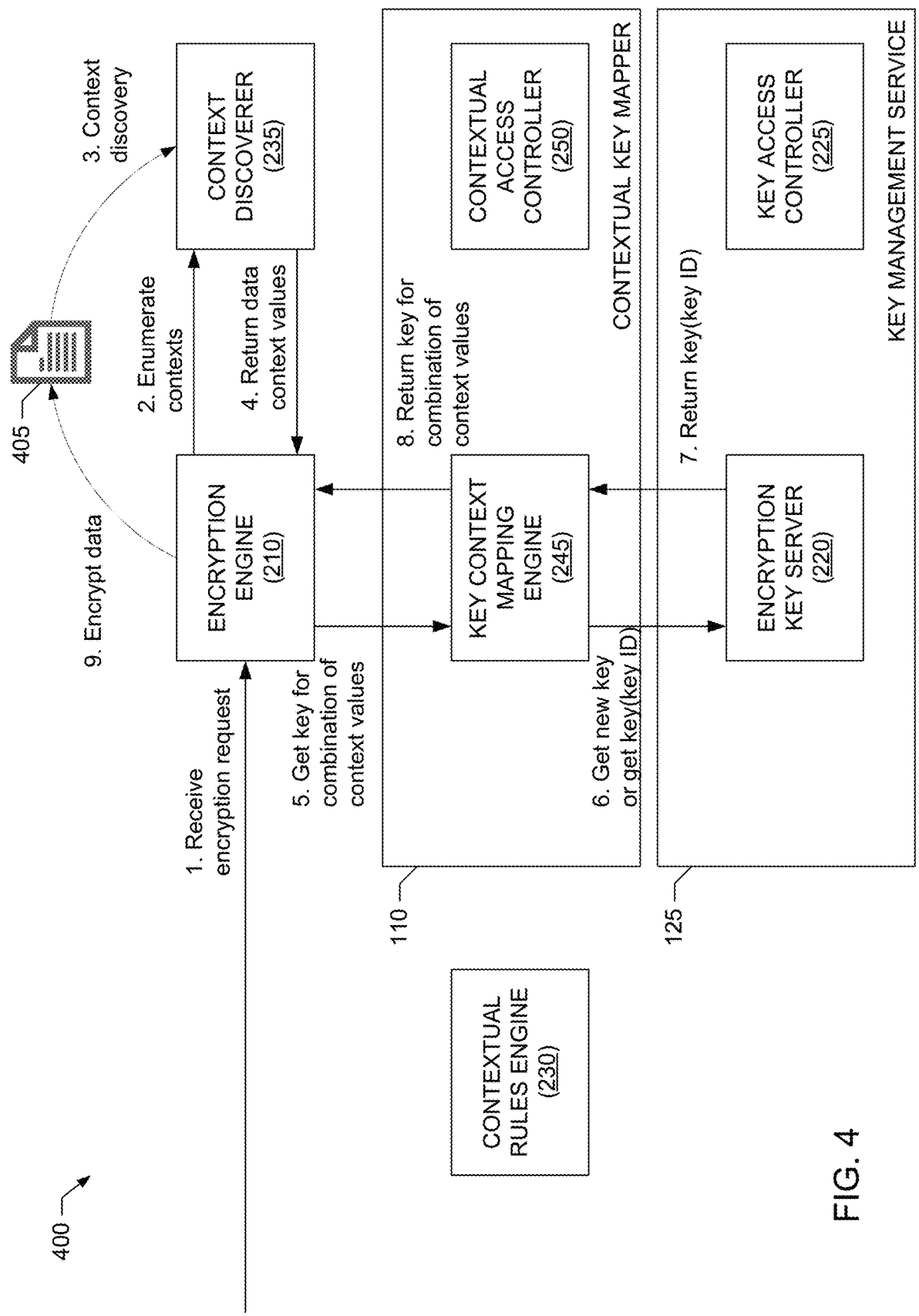
FIG. 4 illustrates an example operation of the contextual key manager of FIGS. 1 and/or 2 to perform data encryption in accordance with teachings of this disclosure.
Figure 5:
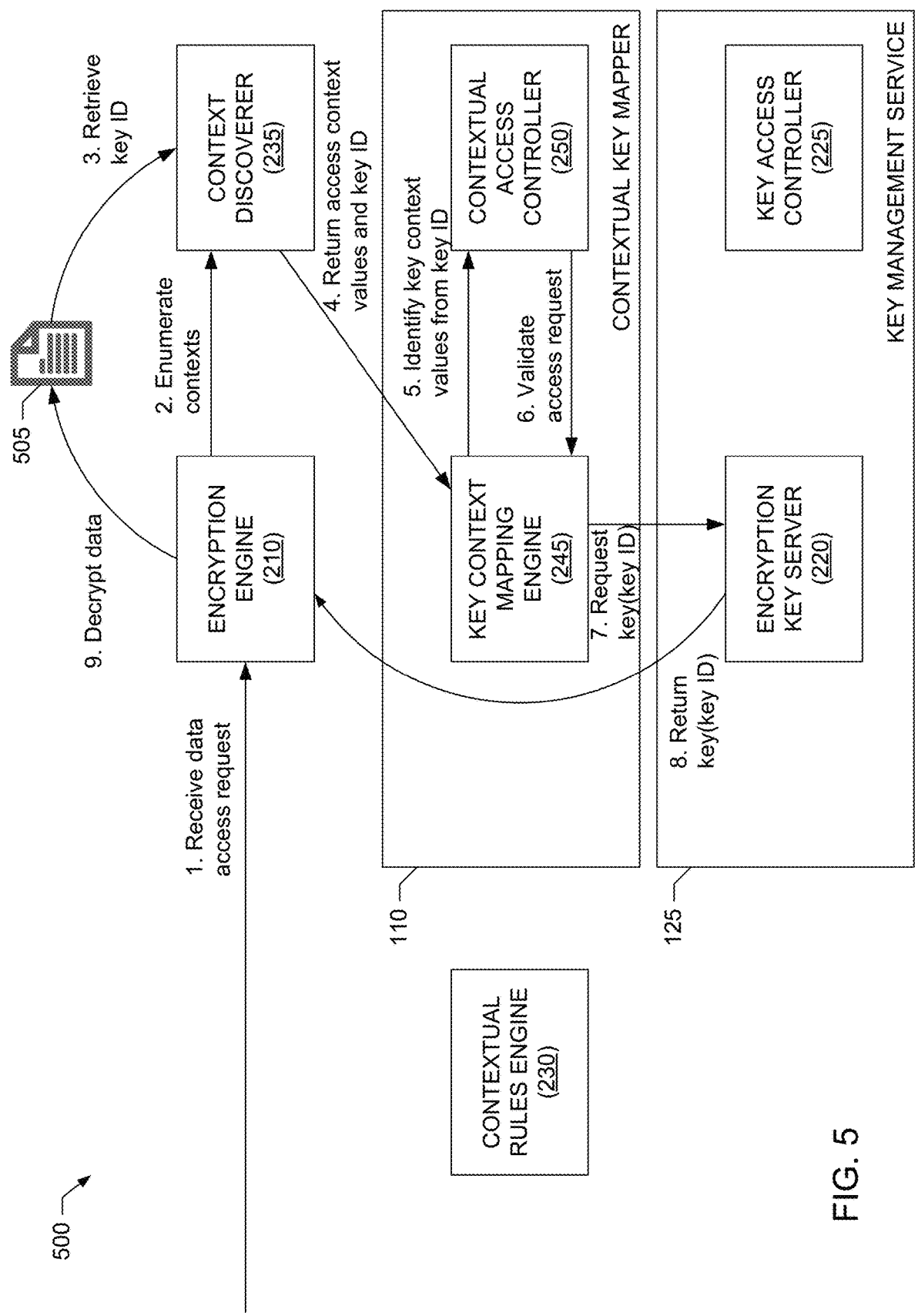
FIG. 5 illustrates an example operation of the contextual key manager of FIGS. 1 and/or 2 to access encrypted data in accordance with teachings of this disclosure.

Further implementation details of the contextual key manager 110 are described in the context of FIGS. 3-5, which illustrate three example stages of operation for the contextual key manager 110. An example operation stage 300 of the contextual key manager 110 to create and/or modify a contextual policy is illustrated in FIG. 3. In the example operation stage 300 of FIG. 3, the contextual rules engine 230 receives user input data from the administrative user interface 205 specifying additional and/or updated context configuration data, and defines the set of possible individual contexts, associated possible context values and context access rules based on the user input configuration data (labeled as operation "1" in FIG. 3). Then, for each individual context rule defined by the contextual rules engine 230, the key context mapping engine 245 of the contextual key mapper 240 creates a mapping between a given possible context value associated with that context rule and a respective key identifier (ID) of a key that is to encrypt/decrypt data associated with the given context rule (labeled as operation "2" in FIG. 3). For example, key context mapping engine 245 may map a first context rule, which specifies that data having a data classification context value of "HIPAA data" is to be protected (e.g., encrypted), to a first key (e.g., Key1), whereas the key context mapping engine 245 may map a second context rule, which specifies that data having a data classification context value of "PCI data" is to be protected (e.g., encrypted), to a second key (e.g., Key2), whereas the key context mapping engine 245 may map a third context rule, which specifies that data having an access classification context value of "secret" is to be protected (e.g., encrypted), to a third key (e.g., Key3), etc. If a key is not yet available for a given individual context rule, the key context mapping engine 245 requests a new key from the key management service 125 (labeled as operation "3" in FIG. 3), which returns the key ID of the new key (labeled as operation "4" in FIG. 3). If a given context value is associated with a context rule specifying an access restriction, the context rule specifying the access restriction associated with the context value is stored in the contextual access controller 250 of the contextual key mapper 240 (labeled as operation "5" in FIG. 3). Thus, when the contextual policy is defined, the only keys created are those directly mapped to individual context rules based on individual context values, and no keys are mapped to combinations of the context rules/values (e.g., respective keys are mapped to the individual context rules based on the individual context values of "HIPAA data", "PCI data," "secret, ", "confidential," etc., but no keys are mapped at this point for a combination of context rules based on a combination of "HIPAA data" and "secret" context values, or a combination of "PCI data" and "confidential" context values, etc.). Rather, the keys that are mapped to combinations of context rules corresponding to combinations of the context values are generated on-demand, as described below.

An example operation stage 400 of the contextual key manager 110 to perform data encryption enforcement is illustrated in FIG. 4. In the example operation stage 400 of FIG. 4, a request to encrypt an example data file 405 is received by the encryption engine 210 (labeled as operation "1" in FIG. 4). For example, this request may come from a system function that is storing the data file 405 in persistent storage. In response to the request, the context discoverer 235 discovers context information associated with the data file 405 based on the set of possible contexts and associated context values and context rules previously defined by the contextual rules engine 230 (labeled as operations "2" and "3" in FIG. 4). The context information discovered by the context discoverer 235 for the data file 405 includes the context values associated with the data file 405 that correspond to the set of possible contexts and associated context values and context rules previously defined by the contextual rules engine 230. As described above, the context discoverer 235 can discover this context information based on parsing text and/or other information from the data file 405, evaluating header data, metadata, etc., associated with the data file 405, and/or evaluating other external sources, such as system clock, geolocation, network data, etc.

Next, the context discoverer 235 provides the set of context values discovered for the data file 405 (e.g., as a list, data array, etc.) to the contextual key mapper 240, which returns the particular key, which corresponds to a set of context rules defined for that set of context values, to be used by the encryption engine 210 to encrypt the data file 405 (e.g., corresponding to operations "4," "5," "6," "7" and "8" in FIG. 4). For example, if the context information discovered by the context discoverer 235 for the data file 405 includes only one context value, the key context mapping engine 245 of the contextual key mapper 240 can identify, based on the map (e.g., mapping matrix) created above in connection with FIG. 3, the key ID of the key mapped to the individual context rule corresponding to that individual context value, and request that key from the key management service 125 by including the key ID in the request (e.g., corresponding to operation "6" and "7" in FIG. 4). For example, the key context mapping engine 245 can send a request to the key management service 125 to return the key related to the context rule specifying that data having the context value "HIPAA data" is to be protected (e.g., encrypted). However, if the context information discovered by the context discoverer 235 for the data file 405 includes multiple context values, the key context mapping engine 245 of the contextual key mapper 240 will attempt to identify a key ID that is already mapped to a combination of context rules corresponding to that particular combination of context values (e.g., because that combination of context values was discovered previously for other data that has undergone encryption). If such a key ID mapping is found, the key context mapping engine 245 can request that key from the key management service 125 by including the key ID in the request (e.g., corresponding to operation "6" and "7" in FIG. 4). For example, the key context mapping engine 245 can send a request to the key management service 125 to return the key mapped to the combination of context rules specifying that (i) data having the context value of "HIPAA data" is to be protected (e.g., encrypted) and (ii) data having the context value of "secret" is to be protected (e.g., encrypted). However, if the key context mapping engine 245 determines that no key ID is yet mapped to a combined context rules corresponding to the particular combination of context values, the key context mapping engine 245 sends a request to the key management service 125 to obtain a new key (e.g., corresponding to operation "6" and "7" in FIG. 4) to be associated with the combination of context rules corresponding to that particular combination of context values. For example, the key context mapping engine 245 can send a request to the key management service 125 to return the key that will be mapped to a combination of context rules specifying that (i) data having the context value of "HIPAA data" is to be protected (e.g., encrypted) and (iii) data having the context value of "confidential" is to be protected (e.g., encrypted). The key context mapping engine 245 then maps the key ID of the new key to the combination of context rules corresponding to this particular combination of context values and stores this mapping for future use.

After the key context mapping engine 245 of the contextual key mapper 240 obtains the requested key from the key management service 125, the key context mapping engine 245 returns the key to the encryption manager 210 (labeled as operation "8" in FIG. 4). The encryption engine 210 then uses this key to encrypt the data file 405 (labeled as operation "9" in FIG. 4). The encryption engine 210 also associates the key ID of the key with the encrypted data file 405 (e.g., by including the key ID in header information and/or metadata of the encrypted data file 405, etc.) In this way, the contextual key manager 110 causes the data file 405 to be encrypted by a particular key that corresponds to a particular combination of context information discovered for the data file 405.

An example operation stage 500 of the contextual key manager 110 to provide access to encrypted data is illustrated in FIG. 5. In the example operation stage 500 of FIG. 4, a request to access an example encrypted data file 505 is received by the encryption engine 210 (labeled as operation "1" in FIG. 4). For example, this request may come from a user's computing device that is requesting access to the encrypted data file 505 from persistent storage. In response to the access request, the context discoverer 235 discovers context information associated with the access request based on the set of possible contexts and associated context values and context rules previously defined by the contextual rules engine 230 (labeled as operation "2" in FIG. 5). The context information discovered by the context discoverer 235 for the access request includes the context values associated with the access request that correspond to the set of possible contexts and associated context values previously defined by the contextual rules engine 230. The context discoverer 235 can discover this context information based on data, such as metadata, information elements, etc., included in the access request and/or signaling conveying the access request, etc., but not from the content of the encrypted data file 505 itself which is encrypted. For example, the context discoverer 235 can discover the identity of the user requesting access to the data file 505, and potentially other contextual information, such as a geographic location of the user, time-of-day, etc.

In the illustrated example, the context discoverer 235 also determines the key ID of the key that was used to encrypt the encrypted data file 505 (labeled as operation "3" in FIG. 5). For example, the context discoverer 235 can determine the key ID from header information, metadata, etc., included with the encrypted data file 505 when it was encrypted by the encryption engine 210. Next, the context discoverer 235 provides the set of context values discovered for the access request (e.g., as a list, data array, etc.) and the key ID of the key to be used to decrypt the encrypted file 505 to the contextual key mapper 240 (labeled as operation "4" in FIG. 5). The key context mapping engine 245 of the contextual key mapper 240 identifies the set of context rules (e.g., one context rule or a combination of context rules) mapped to the key ID (also referred to as key mapped context rules) (labeled as operation "5" in FIG. 5).

For each key mapped context rule having an associated access restriction, the key context mapping engine 245 invokes the contextual access controller 250 of the contextual key mapper 110 to validate whether the user is allowed access based on that key mapped context rule (labeled as operation "6" in FIG. 5). If the discovered context values of the access request are validated against all the key mapped context rules associated with the key ID, the key context mapping engine 245 grants access to the key and sends a request to the key management service 125 to return the key corresponding to the key ID (labeled as operation "7" in FIG. 5). In response, the key management service 125 releases the key to the key context mapping engine 245 (labeled as operation "7" in FIG. 5), which returns the key to the encryption engine 210 (labeled as operation "8" in FIG. 5). The encryption engine 210 then uses the retrieved key to decrypt the encrypted data file 505 (labeled as operation "9" in FIG. 5).

Thus, in view of the foregoing disclosure, the contextual rules engine 230 of the illustrated examples implements means for defining a group of possible contexts and associated context values and context rules to be evaluated by the context discoverer 235 and the contextual key mapper 240. In some examples, the group of possible contexts includes at least two of a data classification context, an access classification context, a geographic location context, a time context, a business organization context, a user context, a data destination context and/or other context(s). The contextual rules engine 230 further defines possible context value(s) for respective ones of the group of possible contexts, and context rule(s) based on the context value(s).

In view of the foregoing disclosure, the context discoverer 235 implements means for discovering context information associated with a request to access encrypted data. For example, when the group of possible contexts includes at least two of a data classification context, an access classification context, a geographic location context, a time context, a business organization context, a user context, a data destination context and/or other context values(s), the context discoverer 235 may determine at least two of a data classification context value associated with the request to access the encrypted data, an access classification context value associated with the request to access the encrypted data, a geographic location context value associated with the request to access the encrypted data, a time context value associated with the request to access the encrypted data, a business organization context value associated with the request to access the encrypted data, a user context value associated with the request to access the encrypted data, a data destination context value associated with the request to access the encrypted data, and/or other context values(s) associated with the request to access the first encrypted data.

In view of the foregoing disclosure, the contextual key mapper 240 implements means for identifying a combination of context rules associated with a key that is to provide access to encrypted data in response to a request to access the encrypted data. For example, when the group of possible contexts includes at least two of a data classification context, an access classification context, a geographic location context, a time context, a business organization context, a user context, a data destination context and/or other context(s), the combination of context rules identified by the contextual key mapper 240 for the key may include at least two of a data classification context rule associated with the key, an access classification context rule associated with the key, a geographic location context rule associated with the key, a time context rule associated with the key, a business organization context rule associated with the key, a user context rule associated with the key, a data destination context rule associated with the key and/or other context rule(s) associated with the key.

The contextual key mapper 240 also implements means for validating the context information associated with the request to access the encrypted data to determine whether the request to access the first encrypted data is valid. Such validation is based on the combination of context rules associated with the key. The contextual key mapper 240 further implements means for obtaining the key from the key management service 125 when the request to access the encrypted data is valid, and providing the key to the encryption engine 210, which is to decrypt the encrypted data in response to the request to access the encrypted data.

In view of the foregoing disclosure, to encrypt unencrypted data, the context discoverer 235 implements means for evaluating, based on the plurality of possible contexts defined by the contextual rules engine 230, context information associated with the unencrypted data to determine the combination of context values to be associated with the key that is to encrypt and decrypt that data. For example, the context discoverer 235 may evaluate the context information associated with the unencrypted data in response to a request to encrypt the unencrypted data to form the encrypted data described above.

In view of the foregoing disclosure, to encrypt unencrypted data, the contextual key mapper 240 implements means for determining whether the combination of context rules to be associated with the key to encrypt the data has been determined previously for other unencrypted data that has undergone encryption. The contextual key mapper 240 further implements means for sending a request to the key management service 125 to retrieve the key (e.g., based on a key ID) when the combination of context rules has been determined previously for other unencrypted data that has undergone encryption, or sending a request to the key management service 125 to generate the key (e.g., a new key) when the combination of context rules has not been determined previously for other unencrypted data that has undergone encryption. The contextual key mapper 240 also implements means for providing the key to the encryption engine 210 to encrypt the unencrypted data to form the encrypted data described above.

In some examples, the contextual key mapper 240 further implements means for mapping the combination of context rules associated with a key, which is to be used to encrypt data, to a key identifier identifying the key. The contextual key mapper 240 in such examples can also implement means for providing the key identifier to the encryption engine 210, which is to include (e.g., store) the key identifier with the encrypted data. The contextual key mapper 240 in such examples can further implement means for mapping the key identifier, which is included with the encrypted data, to the combination of context rules associated with the key in response to a request to access the encrypted data that was encrypted based on the key. In this way, the contextual key mapper 240 is able to identify the combination of context rules associated with the key.

While an example manner of implementing the contextual key manager 110 of FIG. 1 is illustrated in FIGS. 2-5, one or more of the elements, processes and/or devices illustrated in FIGS. 2-5 may be combined, divided, re-arranged, omitted, eliminated and/or implemented in any other way. Further, the example contextual rules engine 230, the example context discoverer 235, the example contextual key mapper 240, the example key context mapping engine 245, the example contextual access controller 250 and more generally, the example contextual key manager 110 of FIGS. 2-5 may be implemented by hardware, software, firmware and/or any combination of hardware, software and/or firmware. Thus, for example, any of the example contextual rules engine 230, the example context discoverer 235, the example contextual key mapper 240, the example key context mapping engine 245, the example contextual access controller 250 and more generally, the example contextual key manager 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example contextual key manager 110, the example contextual rules engine 230, the example context discoverer 235, the example contextual key mapper 240, the example key context mapping engine 245 and/or the example contextual access controller 250 is/are hereby expressly defined to include a non-transitory computer readable storage device or storage disk such as a memory, a digital versatile disk (DVD), a compact disk (CD), a Blu-ray disk, etc. including the software and/or firmware. Further still, the example contextual key manager 110 of FIG. 1 may include one or more elements, processes and/or devices in addition to, or instead of, those illustrated in FIGS. 2-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
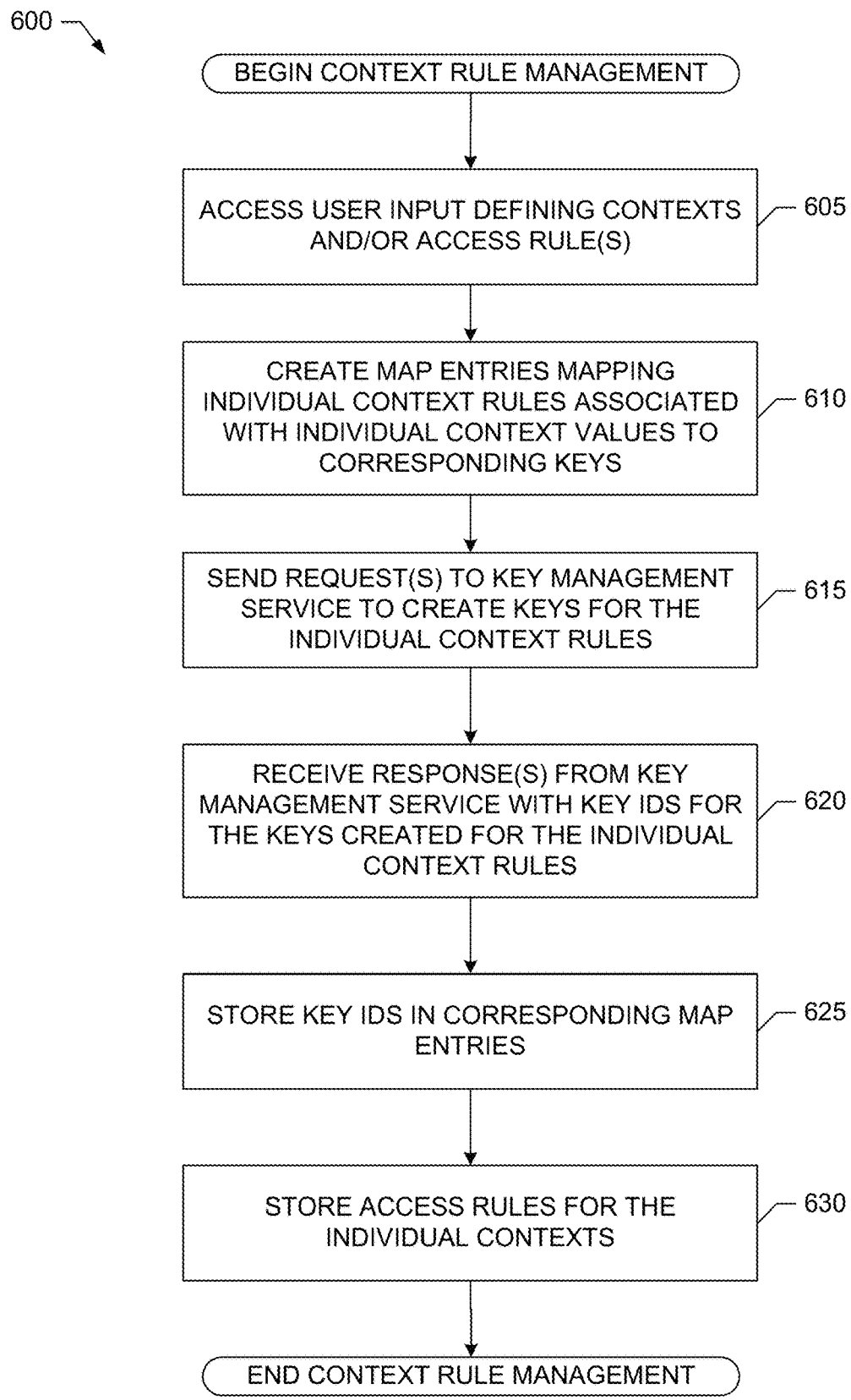
FIGS. 6-8 are flowcharts representative of example computer readable instructions that may be executed to implement the example contextual key manager of FIGS. 1 and/or 2.
Figure 7:
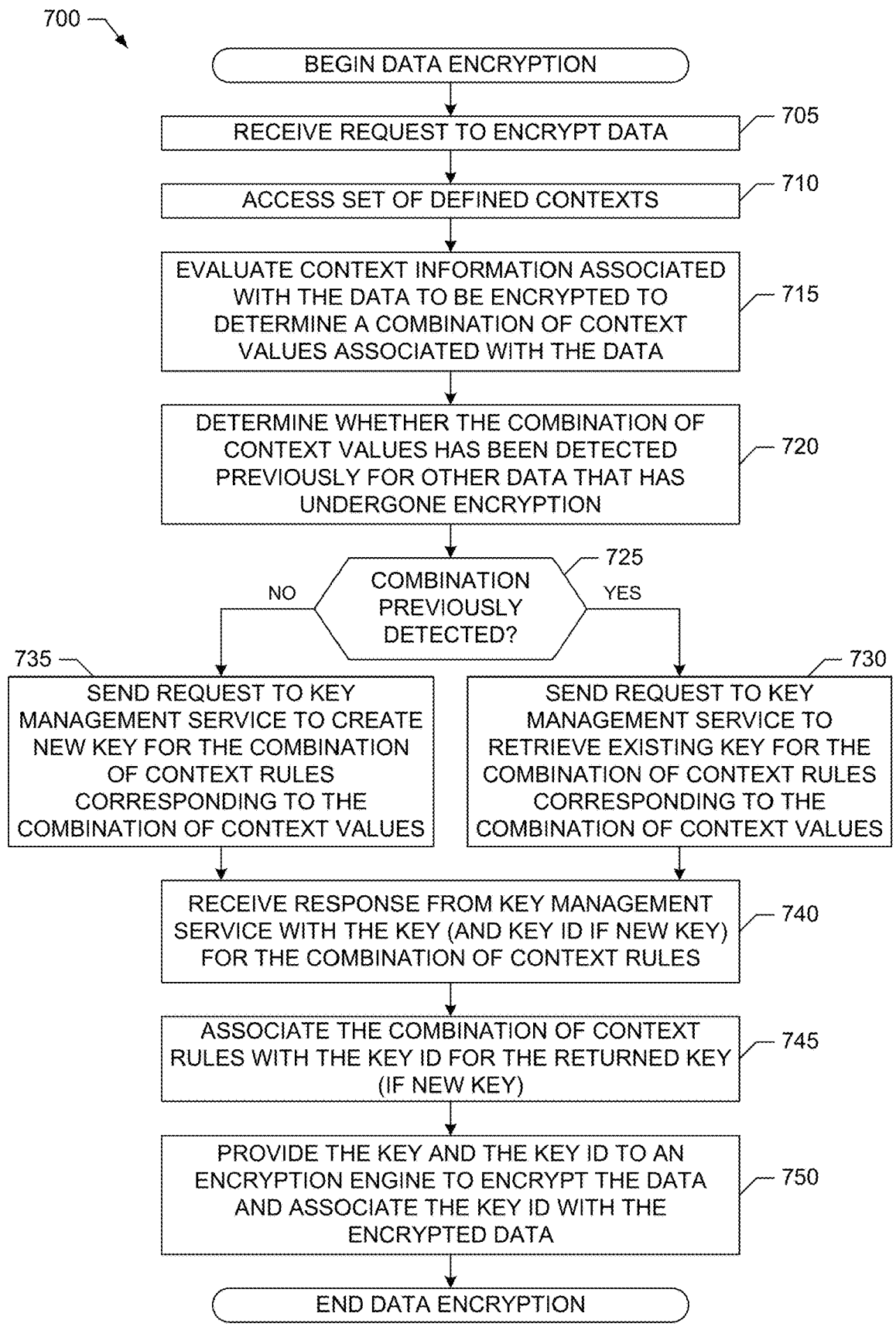
Figure 8:
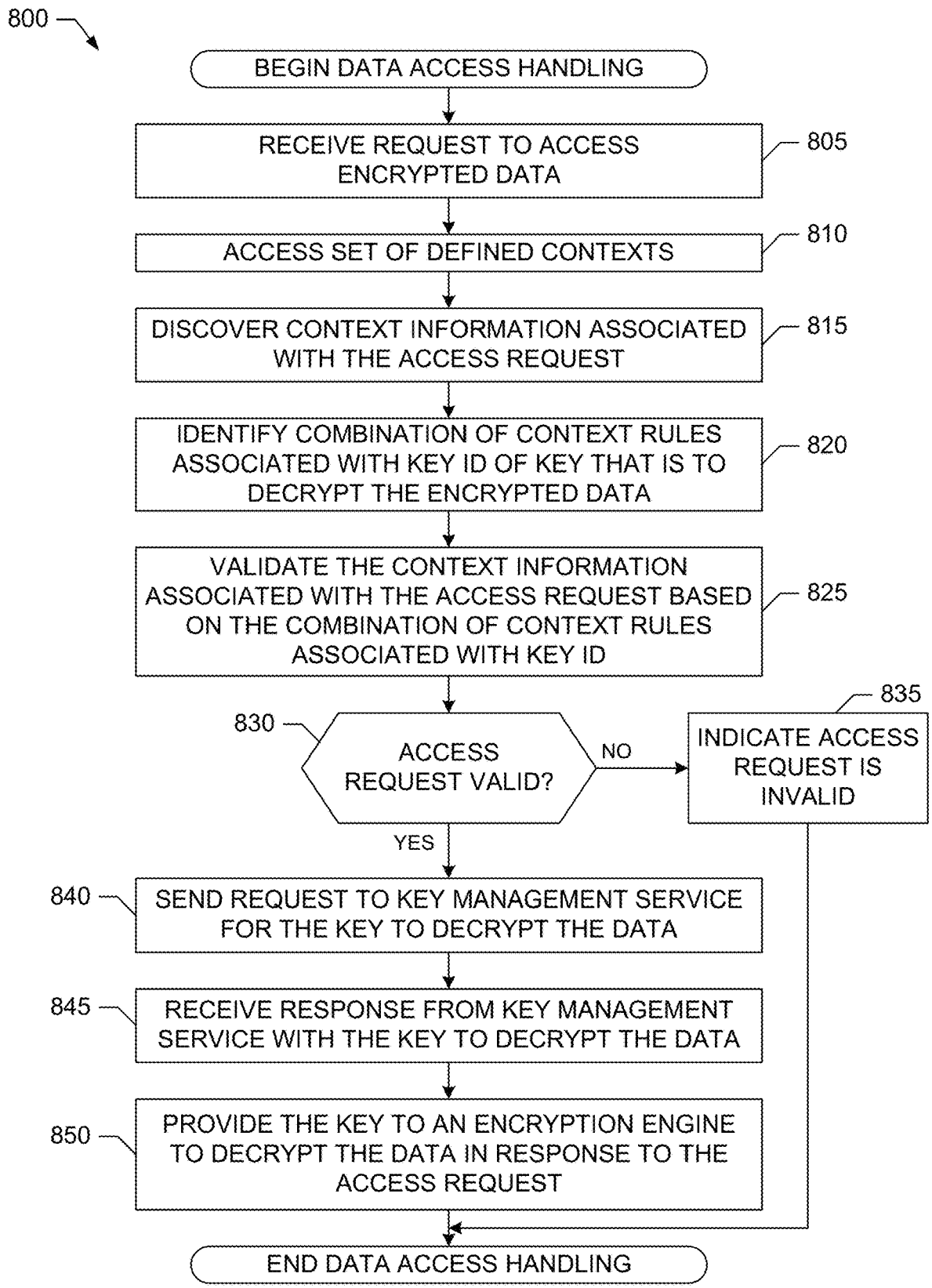

Flowcharts representative of example hardware logic, machine readable instructions, hardware implemented state machines, and/or any combination thereof for implementing the example contextual key manager 110, the example contextual rules engine 230, the example context discoverer 235, the example contextual key mapper 240, the example key context mapping engine 245 and/or the example contextual access controller 250 are shown in FIGS. 6-8. In these examples, the machine readable instructions may be one or more executable programs or portion(s) thereof for execution by a computer processor, such as the processor 912 shown in the example processor platform 900 discussed below in connection with FIG. 9. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 912, but the entire program or programs and/or parts thereof could alternatively be executed by a device other than the processor 912 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-8, many other methods of implementing the example contextual key manager 110, the example contextual rules engine 230, the example context discoverer 235, the example contextual key mapper 240, the example key context mapping engine 245 and/or the example contextual access controller 250 may alternatively be used. For example, with reference to the flowcharts illustrated in FIGS. 6-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example program 600 that may be executed to implement the contextual key manager 110 of FIGS. 1-2 to perform context rule management is represented by the flowchart shown in FIG. 6. With reference to the preceding figures and associated written descriptions, the example program 600 of FIG. 6 begins execution at block 605 at which the example contextual rules engine 230 of the contextual key manager 110 accesses, via the administrative user interface 205, user input specifying contexts and/or access rules to define a set of possible contexts and associated possible context values and context rules to be used by the contextual key manager 110. At block 610, the example contextual key mapper 240 of the contextual key manager 110 creates map entries (e.g., in a mapping matrix) mapping individual context rules corresponding respectively to the individual possible context values to corresponding keys. For example, the individual context rules may each specify that data having the respective possible context value is to be protected (e.g., encrypted). At block 615, the contextual key mapper 240 sends one or more requests to the key management service 125 to create respective keys for the individual context rules. At block 620, the contextual key mapper 240 receives one or more responses from the key management service 125 containing the key IDs for the respective keys that were created for the individual context rules. At block 625, the contextual key mapper 240 stores the returned key IDs in the corresponding map entries created at block 610. At block 630, the contextual key mapper 240 stores any access restrictions specified by the individual context rules for the individual possible context values.

An example program 700 that may be executed to implement the contextual key manager 110 of FIGS. 1-2 to perform data encryption is represented by the flowchart shown in FIG. 7. With reference to the preceding figures and associated written descriptions, the example program 700 of FIG. 7 begins execution at block 705 at which the example context discoverer 235 of the contextual key manager 110 detects a request to encrypt data. At block 710, the context discoverer 235 accesses a set of possible contexts and associated context values (e.g., previously defined by the contextual rules engine 230). At block 715, the context discoverer 235 evaluates context information associated with the data to be encrypted to determine a combination of context values associated with the data. At block 720, the example contextual key mapper 240 of the contextual key manager 110 determines whether the particular combination of context values discovered by the context discoverer 235 was already detected previously for other data that has undergone encryption. If that particular combination of context values has already been detected previously (block 725), at block 730 the contextual key mapper 240 sends a request to the key management service 125 to request the existing key mapped to the combination of context rules for that combination of context values (e.g., by including the key ID associated with the combination of context rules in the request). However, if that particular combination of context values has not been detected previously (block 725), at block 735 the contextual key mapper 240 sends a request to the key management service 125 to create a new key to be mapped to the combination of context rules for that combination of context values. At block 740, the contextual key mapper 240 receives a response from the key management service 125 containing the requested key, as well as a key ID for the requested key if the key is a new key. If the returned key is a new key, at block 745, the contextual key mapper 240 also associates the key ID with the particular combination of context rules (e.g., by including the key ID in the map entry corresponding to that combination of context rules). At block 750, the contextual key mapper 240 provides the requested key and its key ID to the encryption engine 210, which is to encrypt the data based on the key and include the key ID with the encrypted data (e.g., as metadata, header information, etc.).

An example program 800 that may be executed to implement the contextual key manager 110 of FIGS. 1-2 to access encrypted data is represented by the flowchart shown in FIG. 8. With reference to the preceding figures and associated written descriptions, the example program 800 of FIG. 8 begins execution at block 805 at which the example context discoverer 235 of the contextual key manager 110 detects a request to access encrypted data. At block 810, the context discoverer 235 accesses a set of possible contexts and associated context values and context rules (e.g., previously defined by the contextual rules engine 230). At block 815, the context discoverer 235 evaluates context information associated with the access request to determine a combination of context values associated with the access request. The context discoverer 235 also determines (e.g., from header information, metadata, etc., associated with the encrypted data) the key ID for the key to be used to decrypt the data. At block 820, the example contextual key mapper 240 of the contextual key manager 110 identifies (e.g., based on the mapping described above) a combination of context rules associated with the key that is to be used to decrypt the data. At block 825, the contextual key mapper 240 validates the context information associated with the access request based on the combination of context rules associated with key. For example, the contextual key mapper 240 determines whether the combination of context rules associated with key are satisfied by the corresponding context values discovered for the access request by the context discoverer 235 at block 815. If the contextual key mapper 240 determines the access request is not valid (e.g., because one or more context values do not meet the requirements of the access rules defined for their respective contexts) (block 830), at block 835 the contextual key mapper 240 indicates the access request is invalid and denies access to the key to be used to decrypt the encrypted data. However, if the contextual key mapper 240 determines the access request is valid (e.g., because all context values meet the requirements of the access rules defined for their respective contexts) (block 830), at block 840 the contextual key mapper 240 grants the access request and sends a request to the key management service 125 to return the key to be used to decrypt the encrypted data (e.g., by including the key ID in the request). At block 845, the contextual key mapper 240 receives a response from the key management service 125 with the requested key. At block 850, the contextual key mapper 240 provides the requested key to the encryption engine 210, which uses the key to decrypt the encrypted data in response to the access request.

Figure 9:
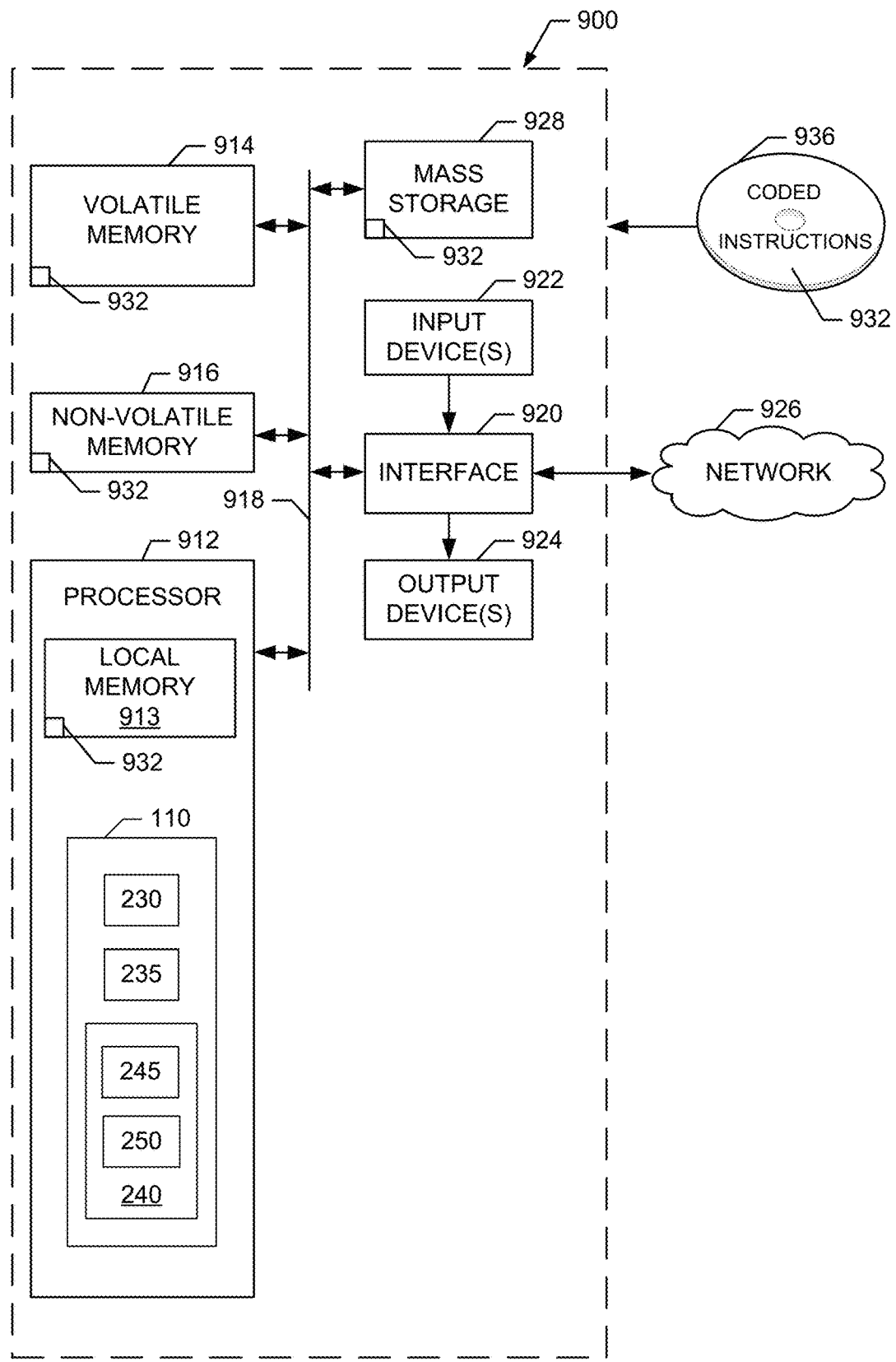
FIG. 9 is a block diagram of an example processor platform structured to execute the example computer readable instructions of FIGS. 6, 7 and/or 8 to implement the example contextual key manager of FIGS. 1 and/or 2.

FIG. 9 is a block diagram of an example processor platform 900 structured to execute the instructions of FIGS. 6-8 to implement the example contextual key manager 110 of FIGS. 1-5. The processor platform 900 can be, for example, a server, a personal computer, a workstation, a self-learning machine (e.g., a neural network), a mobile device (e.g., a cell phone, a smart phone, a tablet such as an iPad™), or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example contextual rules engine 230, the example context discoverer 235, the example contextual key mapper 240, the example key context mapping engine 245 and/or the example contextual access controller 250.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL), connection, a telephone line connection, coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 corresponding to the instructions of FIGS. 6-8 may be stored in the mass storage device 928, in the volatile memory 914, in the non-volatile memory 916, in the local memory 913 and/or on a removable non-transitory computer readable storage medium, such as a CD or DVD 936.

The foregoing disclosure provides examples of contextual key management for data encryption. The following further examples, which include subject matter such as an apparatus to perform contextual encryption key management, a computer-readable storage medium including instructions that, when executed, cause one or more processors to perform contextual encryption key management, and a method to perform contextual encryption key management, are disclosed herein. The disclosed examples can be implemented individually and/or in one or more combinations.

Example 1 is an apparatus to perform contextual encryption key management. The apparatus of example 1 includes a context discoverer implemented by hardware or at least one processor to discover context information associated with a request to access first encrypted data. The apparatus of example 1 also includes a contextual key mapper implemented by hardware or the at least one processor to identify a combination of context rules associated with a key that is to provide access to the first encrypted data, validate the context information associated with the request based on the combination of context rules associated with the key to determine whether the request to access the first encrypted data is valid, and obtain the key from a key management service when the request to access the first encrypted data is valid.

Example 2 includes the subject matter of example 1, wherein the contextual key mapper is further to provide the key to an encryption engine that is to decrypt the first encrypted data in response to the request to access the first encrypted data.

Example 3 includes the subject matter of example 1 or example 2, and further includes a context rule engine to define a plurality of possible contexts and associated context rules to be evaluated by the context discoverer and the contextual key mapper.

Example 4 includes the subject matter of example 3, wherein the plurality of possible contexts is a plurality of heterogeneous contexts including at least two of a data classification context, an access classification context, a geographic location context, a time context, a business organization context, a user context or a data destination context. In example 12, the combination of context rules includes at least two of a data classification context rule associated with the key, an access classification context rule associated with the key, a geographic location context rule associated with the key, a time context rule associated with the key, a business organization context rule associated with the key, a user context rule associated with the key or a data destination context rule associated with the key.

Example 5 includes the subject matter of example 4, wherein the context discoverer is to determine at least two of a data classification context value associated with the request to access the first encrypted data, an access classification context value associated with the request to access the first encrypted data, a geographic location context value associated with the request to access the first encrypted data, a time context value associated with the request to access the first encrypted data, a business organization context value associated with the request to access the first encrypted data, a user context value associated with the request to access the first encrypted data or a data destination context value associated with the request to access the first encrypted data.

Example 6 includes the subject matter of any one of examples 3 to 5, wherein the context information is first context information. In example 6, the context discoverer is further to evaluate, based on the plurality of possible contexts and associated context rules, second context information associated with first unencrypted data to determine the combination of context rules associated with the key, the context discoverer to evaluate the second context information associated with the first unencrypted data in response to a request to encrypt the first unencrypted data to form the first encrypted data. In example 6, the contextual key mapper is further to determine whether the combination of context rules has been determined previously for other unencrypted data that has undergone encryption, send a request to the key management service to retrieve the key when the combination of context rules has been determined previously for other unencrypted data that has undergone encryption, or send a request to the key management service to generate the key when the combination of context rules has not been determined previously for other unencrypted data that has undergone encryption.

Example 7 includes the subject matter of example 6, wherein the contextual key mapper is further to provide the key to an encryption engine to encrypt the first unencrypted data to form the first encrypted data.

Example 8 includes the subject matter of example 7, wherein the contextual key mapper is further to map the combination of context rules associated with the key to a key identifier identifying the key, provide the key identifier to the encryption engine, the encryption engine to include the key identifier with the first encrypted data, and in response to the request to access the first encrypted data, map the key identifier included with the first encrypted data to the combination of context rules associated with the key to identify the combination of context rules associated with the key.

Example 9 is a non-transitory computer readable storage medium including computer readable instructions that, when executed, cause one or more processors to at least discover context information associated with a request to access first encrypted data, identify a combination of context rules associated with a key that is to provide access to the first encrypted data, validate the context information associated with the request based on the combination of context rules associated with the key to determine whether the request to access the first encrypted data is valid, and obtain the key from a key management service when the request to access the first encrypted data is valid.

Example 10 includes the subject matter of example 9, wherein the computer readable instructions, when executed, further cause the one or more processors to provide the key to an encryption engine that is to decrypt the first encrypted data in response to the request to access the first encrypted data.

Example 11 includes the subject matter of example 9 or example 10, wherein the combination of context values is based on at least a subset of a plurality of possible contexts and associated context rules defined based on user input data.

Example 12 includes the subject matter of example 11, wherein the plurality of possible contexts is a plurality of heterogeneous contexts including at least two of a data classification context, an access classification context, a geographic location context, a time context, a business organization context, a user context or a data destination context. In example 12, the combination of context rules includes at least two of a data classification context rule associated with the key, an access classification context rule associated with the key, a geographic location context rule associated with the key, a time context rule associated with the key, a business organization context rule associated with the key, a user context rule associated with the key or a data destination context rule associated with the key.

Example 13 includes the subject matter of example 12, wherein to discover the context information associated with the request to access the first encrypted data, the computer readable instructions, when executed, cause the one or more processors to determine at least two of a data classification context value associated with the request to access the first encrypted data, an access classification context value associated with the request to access the first encrypted data, a geographic location context value associated with the request to access the first encrypted data, a time context value associated with the request to access the first encrypted data, a business organization context value associated with the request to access the first encrypted data, a user context value associated with the request to access the first encrypted data, or a data destination context associated with the request to access the first encrypted data.

Example 14 includes the subject matter of any one or examples 11 to 13, wherein the context information is first context information, and the computer readable instructions, when executed, further cause the one or more processors to: (i) evaluate, based on the plurality of possible contexts and associated context rules, second context information associated with first unencrypted data to determine the combination of context rules associated with the key, the second context information associated with the first unencrypted data to be evaluated in response to a request to encrypt the first unencrypted data to form the first encrypted data; (ii) determine whether the combination of context rules has been determined previously for other unencrypted data that has undergone encryption; (iii) send a request to the key management service to retrieve the key when the combination of context rules has been determined previously for other unencrypted data that has undergone encryption; and (iv) send a request to the key management service to generate the key when the combination of context rules has not been determined previously for other unencrypted data that has undergone encryption.

Example 15 includes the subject matter of example 14, wherein the computer readable instructions, when executed, further cause the one or more processors to provide the key to an encryption engine to encrypt the first unencrypted data to form the first encrypted data.

Example 16 includes the subject matter of example 15, wherein the computer readable instructions, when executed, further cause the one or more processors to: (i) map the combination of context rules associated with the key to a key identifier identifying the key; (ii) provide the key identifier to the encryption engine, the encryption engine to include the key identifier with the first encrypted data; and (iii) in response to the request to access the first encrypted data, map the key identifier included with the first encrypted data to the combination of context rules associated with the key to identify the combination of context rules associated with the key.

Example 17 is a method to perform contextual encryption key management. The method of example 17 includes discovering, by executing an instruction with at least one processor, context information associated with a request to access first encrypted data, and identifying, by executing an instruction with the at least one processor, a combination of context rules associated with a key that is to provide access to the first encrypted data. The method of example 17 also includes validating, by executing an instruction with the at least one processor, the context information associated with the request based on the combination of context rules associated with the key to determine whether the request to access the first encrypted data is valid. The method of example 17 further includes obtaining, by executing an instruction with the at least one processor, the key from a key management service when the request to access the first encrypted data is valid.

Example 18 includes the subject matter of example 17, and further includes providing the key to an encryption engine that is to decrypt the first encrypted data in response to the request to access the first encrypted data.

Example 19 includes the subject matter of example 17 or example 18, wherein the combination of context values is based on at least a subset of a plurality of possible contexts and associated context rules defined based on user input data.

Example 20 includes the subject matter of example 19, wherein the plurality of possible contexts is a plurality of heterogeneous contexts including at least two of a data classification context, an access classification context, a geographic location context, a time context, a business organization context, a user context or a data destination context. In example 20, the combination of context rules includes at least two of a data classification context rule associated with the key, an access classification context rule associated with the key, a geographic location context rule associated with the key, a time context rule associated with the key, a business organization context rule associated with the key, a user context rule associated with the key or a data destination context rule associated with the key.

Example 21 includes the subject matter of example 20, wherein the discovering of the context information associated with the request to access the first encrypted data includes determining at least two of a data classification context value associated with the request to access the first encrypted data, an access classification context value associated with the request to access the first encrypted data, a geographic location context value associated with the request to access the first encrypted data, a time context value associated with the request to access the first encrypted data, a business organization context value associated with the request to access the first encrypted data, a user context value associated with the request to access the first encrypted data or a data destination context value associated with the request to access the first encrypted data.

Example 22 includes the subject matter of any one of examples 19 to 21, wherein the context information is first context information. Example 22 further includes: (i) evaluating, based on the plurality of possible contexts and associated context rules, second context information associated with first unencrypted data to determine the combination of context rules associated with the key, the second context information associated with the first unencrypted data to be evaluated in response to a request to encrypt the first unencrypted data to form the first encrypted data; (ii) determining whether the combination of context rules has been determined previously for other unencrypted data that has undergone encryption; (iii) sending a request to the key management service to retrieve the key when the combination of context rules has been determined previously for other unencrypted data that has undergone encryption; and (iv) sending a request to the key management service to generate the key when the combination of context rules has not been determined previously for other unencrypted data that has undergone encryption.

Example 23 includes the subject matter of example 22, and further includes further including providing the key to an encryption engine to encrypt the first unencrypted data to form the first encrypted data.

Example 24 includes the subject matter of example 23, and further includes: (i) mapping the combination of context rules associated with the key to a key identifier identifying the key; (ii) providing the key identifier to the encryption engine, the encryption engine to include the key identifier with the first encrypted data; and (iii) in response to the request to access the first encrypted data, mapping the key identifier included with the first encrypted data to the combination of context rules associated with the key to identify the combination of context rules associated with the key.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
   interface circuitry;
   computer readable instructions; and
   at least one processor circuit to be programmed by the computer readable instructions to:
   access a combination of context rules based on a key associated with encrypted data, the combination of context rules including at least two context rules;
   obtain first context information and second context information associated with the combination of context rules, the second context information different from the first context information, the first context information specifying a geographic location of a requesting device associated with a request to access the encrypted data, the second context information specifying whether an access restriction is implemented by a destination device, the destination device to store decrypted data when obtained from the request to access the encrypted data; and
   evaluate the combination of context rules based on the first context information and the second context information to validate the request.

2. The apparatus of claim 1, wherein one or more of the at least one processor circuit is to identify the key based on header information of the encrypted data.

3. The apparatus of claim 1, wherein one or more of the at least one processor circuit is to identify the key based on metadata associated with the encrypted data.

4. The apparatus of claim 1, wherein the key is a first key, and one or more of the at least one processor circuit is to identify the combination of context rules based on a data structure that is to map respective ones of a plurality of keys to respective combinations of context rules, the plurality of keys including the first key.

5. The apparatus of claim 4, wherein the combination of context rules is a first combination of context rules, and the data structure is to map a second key to a second combination of context rules different from the first combination of context rules.

6. The apparatus of claim 4, wherein the plurality of keys is a first plurality of keys, and the data structure is to map respective ones of a second plurality of keys to respective ones of a plurality of individual context rules.

7. The apparatus of claim 1, wherein one or more of the at least one processor circuit is to obtain third context information that is to identify a user associated with the request.

8. The apparatus of claim 1, wherein one or more of the at least one processor circuit is to decrypt the encrypted data based on the key to obtain the decrypted data after a determination that the request is valid.

9. At least one non-transitory computer readable medium comprising instructions to cause at least one processor circuit to at least:
identify, based on a data structure, a first combination of context rules associated with a first cryptographic key, the first cryptographic key associated with encrypted data, the data structure to map respective ones of a plurality of cryptographic keys to respective combinations of context rules, the plurality of cryptographic keys including the first cryptographic key;
discover first context information and second context information associated with the first combination of context rules, the second context information different from the first context information, the first context information specifying whether an access restriction is enforced at a destination device that is to store decrypted data when obtained from a request to access the encrypted data, the second context information specifying a geographic location of a requesting device associated with the request to access the encrypted data; and evaluate the first combination of context rules based on the first context information and the second context information to validate the request.

10. The at least one non-transitory computer readable medium of claim 9, wherein the data structure is to map a second cryptographic key to a second combination of context rules different from the first combination of context rules.

11. The at least one non-transitory computer readable medium of claim 9, wherein the plurality of cryptographic keys is a first plurality of cryptographic keys, and the data structure is to map respective ones of a second plurality of cryptographic keys to respective ones of a plurality of individual context rules.

12. The at least one non-transitory computer readable medium of claim 9, wherein the instructions are to cause one or more of the at least one processor circuit to identify the first cryptographic key based on header information of the encrypted data.

13. The at least one non-transitory computer readable medium of claim 9, wherein the instructions are to cause one or more of the at least one processor circuit to identify the first cryptographic key based on metadata associated with the encrypted data.

14. A method comprising:
accessing, by at least one processor circuit programmed by at least one instruction, a data structure to determine a first combination of context rules associated with a first cryptographic key, the first cryptographic key associated with encrypted data, the data structure to map respective ones of a plurality of cryptographic keys to respective combinations of context rules, the plurality of cryptographic keys including the first cryptographic key;
discovering, by one or more of the at least one processor circuit, first context information and second context information associated with the first combination of context rules, the second context information different from the first context information, the first context information specifying a geographic location of a requesting device associated with a request to access the encrypted data, the second context information specifying whether an access restriction is implemented by a destination device, the destination device to store decrypted data when obtained from the request to access the encrypted data;
determining whether the request to access the encrypted data is valid based on the first combination of context rules, the first context information and the second context information; and decrypting the encrypted data after a determination that the request is valid.

15. The method of claim 14, wherein the data structure maps a second cryptographic key to a second combination of context rules different from the first combination of context rules.

16. The method of claim 14, wherein the plurality of cryptographic keys is a first plurality of cryptographic keys, and the data structure maps respective ones of a second plurality of cryptographic keys to respective ones of a plurality of individual context rules.

17. The method of claim 16, wherein the data structure is a matrix including first entries that map the respective ones of the plurality of cryptographic keys to the respective combinations of context rules and second entries that map the respective ones of the second plurality of cryptographic keys to the respective ones of the plurality of individual context rules.

18. The method of claim 14, including identifying the first cryptographic key based on at least one of header information of the encrypted data or metadata associated with the encrypted data.

* * * * *